United States Patent
Asokan et al.

(10) Patent No.: US 9,098,500 B1
(45) Date of Patent: Aug. 4, 2015

(54) REVISION HISTORY STORAGE AND MAINTENANCE

(75) Inventors: Vasanth Asokan, San Jose, CA (US); Raj Nagarajan, Fremont, CA (US); Chukwuweta Chukwudebe, Milpitas, CA (US)

(73) Assignee: XILINX, INC., San Jose, CA (US)

(*) Notice: Subject to any disclaimer, the term of this patent is extended or adjusted under 35 U.S.C. 154(b) by 637 days.

(21) Appl. No.: 12/757,019

(22) Filed: Apr. 8, 2010

(51) Int. Cl.
*G06F 17/30* (2006.01)

(52) U.S. Cl.
CPC .................................. *G06F 17/30011* (2013.01)

(58) Field of Classification Search
CPC ................................................. G06F 17/30011
USPC ......................................................... 707/812
See application file for complete search history.

(56) References Cited

U.S. PATENT DOCUMENTS

| | | | |
|---|---|---|---|
| 6,993,710 B1* | 1/2006 | Coad et al. | 715/202 |
| 8,180,589 B2* | 5/2012 | Toyoshima | 702/123 |
| 2004/0261058 A1* | 12/2004 | Kundert | 717/119 |
| 2006/0206866 A1* | 9/2006 | Eldrige et al. | 717/122 |
| 2006/0284861 A1* | 12/2006 | Choi | 345/204 |
| 2009/0083268 A1* | 3/2009 | Coqueret et al. | 707/6 |

OTHER PUBLICATIONS

Balasubramanian, Krishnakumar, et al. "Developing applications using model-driven design environments." Computer 39.2 (2006): 33-40.*
Connors, Daniel A., et al. "Hardware support for dynamic activation of compiler-directed computation reuse." ACM SIGPLAN Notices 35.11 (2000): 222-233.*

* cited by examiner

*Primary Examiner* — Usmaan Saeed
*Assistant Examiner* — Nan Hutton
(74) *Attorney, Agent, or Firm* — LeRoy D. Maunu

(57) ABSTRACT

In one embodiment of the present invention, a method is provided for maintaining and storing revision history of a design. The method includes, in response to a first control input by a user, determining, by a processor, module definition parameters that have changed from a design file. The changed module definition parameters are stored in the design file. For each changed module definition parameter, revision data are appended to revision history data. The revision data indicates a revision identifier, a module definition parameter identifier, and an updated value of the changed module definition parameter.

10 Claims, 6 Drawing Sheets

REVISION HISTORY STORAGE AND MAINTENANCE

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

An embodiment of the present invention generally relates to the storage and maintenance of revision history.

BACKGROUND

In the drafting of electronic documents it is often desirable to store periodic versions of the document so previous versions can be reviewed and undesirable changes can be reversed at a later time. As software is designed or developed, multiple developers often concurrently design interdependent segments of a larger design separately. Multiple versions of various electronic documents may be created as a developer makes changes to one portion of a design. When changes are incorporated into a larger design, modifications made by the developer may adversely affect design aspects of a segment created by another developer. When design bugs and other issues become apparent, it is not always clear which changes to various segments contributed to the problem. For the purposes of locating and fixing bugs, it is important for developers to be able to retrieve and run different versions of a design in an organized fashion to determine in which versions the problem occurs so that the source of the problem can be traced.

Version control systems are systems which monitor and track changes made to files checked in and out of a data repository. Version control systems are generally centralized stand-alone applications that control access and modifications to files stored in the central data repository. Version control systems may also be implemented as distributed systems on a file-by-file basis. These systems may be included in various software applications such as word processors.

In shared-file development situations, updates made to files are submitted to the repository so they can be accessed by other developers. Multiple versions of files are generally stored for each revision. Hierarchy data of the various versions may also be stored, the hierarchical data indicating the previous version which each stored version was derived from. Together, the hierarchical data and stored versions create a revision history that may be used to determine the substance and order of changes made during development of a design. When a user wishes to review a previous version, the previous version is retrieved from the repository.

These systems may be inefficient when many near-identical copies of a file are created when small changes are performed. Changes are also tracked in a manner such that the relationship between different revisions to the same object are not maintained. For example, a design file may contain ten design modules. If a software bug becomes apparent in one specific module, these systems do not provide methods to review previous changes to the specific module. Rather, all revisions must be searched and compared regardless of whether they include changes to the module or not.

The present invention may address one or more of the above issues.

SUMMARY

In one embodiment of the present invention, a method is provided for maintaining and storing revision history of a design. The method includes, in response to a first control input by a user, determining, by a processor, module definition parameters that have changed from a design file. The changed module definition parameters are stored in the design file. For each changed module definition parameter, revision data are appended to revision history data. The revision data indicates a revision identifier, a module definition parameter identifier, and an updated value of the changed module definition parameter.

In another embodiment, a method is provided for updating a software design environment workspace. A hardware design revision history is retrieved by a processor, where the hardware design revision history indicates revision data for each change to module definition parameters of the hardware design, and the revision data indicates a revision identifier and an updated value of each changed module definition parameter. A revision identifier of a current configuration of the workspace is determined. A hardware design revision history is parsed. A current value is determined for each module definition parameter corresponding to a most recent revision identifier in the hardware design revision history. For each module definition parameter, differences are determined between the current value and a value of the parameter in the workspace.

In yet another embodiment, a method is provided for updating a design workspace containing one or more data structures and maintaining revision history. An updated version of a data structure file is input for one of the one or more data structures contained in the workspace. Objects of the one data structure that have been modified from a previous version are determined by a processor. Modified objects are displayed and, in response to a first control input indication to proceed with changes, for each modified object and corresponding object in the design workspace, a value of the corresponding object in the design workspace is overwritten with a value of the modified object in the updated version of the data structure file. Revision data is appended to revision history data. The revision data indicates a revision identifier, an object identifier of the modified object, and an updated value of the modified object.

In another embodiment, a user interface includes a first sub-window pane that displays, on a display device, a plurality of objects. The user interface also includes a second sub-window pane that displays the contents of a selected one of the plurality of objects, and a third sub-window pane that displays changes that are specific to the selected object. The changes that are specific to the selected object is based on revision data for the selected object, where the revision data indicates a revision identifier, a module definition parameter identifier, and an updated value of the changed module definition parameter.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION OF THE DRAWINGS

Figure 1:
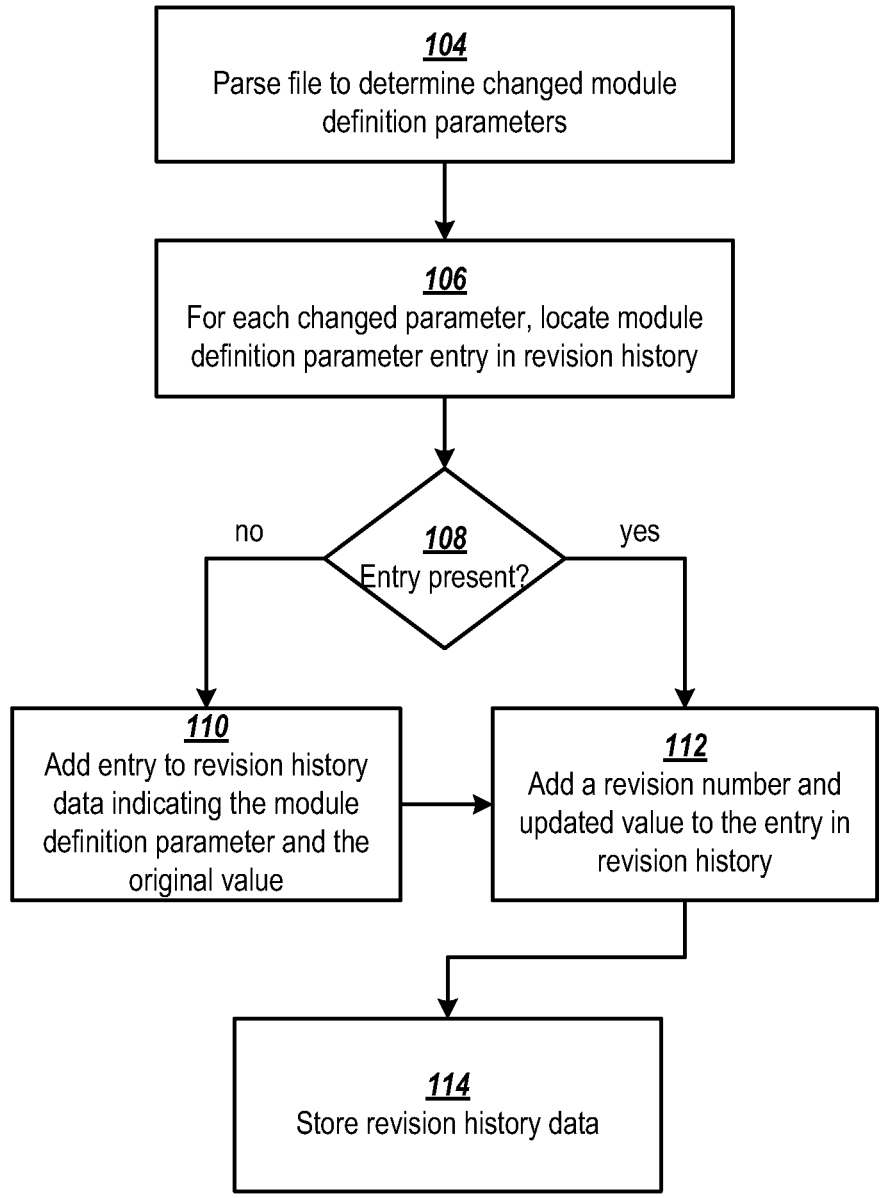
FIG. 1 shows a flowchart of a process for maintaining and storing revision history of module definitions in accordance with an embodiment of the invention.

In many applications, it is desirable to review a revision history of changes to a specific data object made across several revisions. Current systems for tracking and maintaining the revision history do not store revisions in a structured manner that preserves the relationship between different revisions of the same data object. The present invention provides approaches for maintaining and storing the revision history in which the revision history is maintained for and organized by data objects.

In one embodiment of the invention, the revision history is maintained and stored for data structures included in a file. When changes are made to the file and stored, changes to data objects of the data structures are determined. An entry is added to the revision history for those data structures or parameters that are modified. When a subsequent change is made to a data object, revision history data is appended to the existing entry for the data object in the revision history data. Revision data includes a data object value and a revision identifier. The revision identifier could be a number of indicators such as a unique revision number, a date, a time, etc. A number of different values may be stored depending on the implementation.

Because the revision history is organized or indexed according to the data object modified, a complete revision history of the data object can easily be retrieved without parsing through all revisions contained in the revision history. In this manner, the relationship between different revisions of the same data object is maintained. Because only modified values are appended to the revision data entries, less space is needed to store revision history data than methods that store a copy of the file in its entirety for each revision.

Although the invention is thought to be applicable to a number of revision history applications, one or more embodiments are particularly applicable to the maintenance of revision history in the development of software and/or hardware designs. While the invention is not limited to such applications, one or more embodiments are best illustrated when described in this context.

As software is designed or developed, multiple developers often concurrently design interdependent segments of a larger design separately. For example, one developer may create software intended for use on or with a hardware design that is under development. The software developer may be provided with data structures of module definitions for various hardware components that describe the function and behavior of the components, and compatible software can be written using these definitions. The module definitions may include several data objects or module parameters such as timing or bit-width of a module input. As the hardware design is developed, tested, and debugged, several modifications may be made to the hardware design. When revisions are made to the hardware, the revisions are provided to the software developer. These changes may be large, such as the replacement of a module, or may include a minor adjustment to a parameter of the module, such as a value indicating timing of an input. When a software design is updated with a new revision of a module definition, the change may adversely affect the performance of the software. Portions of the software previously verified as functioning correctly may no longer function as intended.

The descriptions of one or more embodiments may use different terminology depending on the application or the embodiment described. Some embodiments refer to data structures as module definitions, and such terms are used interchangeably herein. Data structure objects are sometimes referred to as data objects or parameters, and such terms are used interchangeably herein.

FIG. 1 shows a flowchart of an example process for maintaining and storing revision history of module definitions in accordance with one embodiment of the invention. When the revision history is to be saved, the design file is parsed to determine changes to module definition parameters of the file at step 104. For each changed parameter, the module definition parameter entry of the parameter is located in the current revision history data file at step 106. If an entry corresponding to the changed parameter is located at decision step 108, a revision number and updated value are added to the entry in the revision history. If a module definition parameter entry is not present, at step 110, a new entry is added to the revision history data indicating the module definition parameter and the original value. At step 112, a revision number and update value are added to the entry. At step 114, the revision history data is stored in a file such as, e.g., the design file. The revision history data may be stored as meta data or as comments in the design file.

The revision history entries may be structured in a number of different ways depending on the implementation. For example, data added to a revision history entry may include the current value of the module definition parameter. The value may indicate that the parameter was changed to the value in the revision history indicated by the revision identifier. In another implementation, when revisions are stored, the previous value may be added to the revision history. In the latter case, the current value of a parameter would be indicated by the value stored in the design file.

In the previous example of FIG. 1, when a new entry was created, the original and updated values are stored. If a parameter is newly added, there is no original value to be stored. In some configurations, the data may be stored in a format indicating with a special character, such as null, for the original value, if the parameter is newly created.

Revision history may or may not be stored for unchanged parameters. For example, a design may contain a module definition with three parameters, A, B, and C, where A and B have been changed and C remains unmodified. In one embodiment, the stored revision history may indicate current module definition parameters for A, B, and C, even though C has not been updated. It is noted that even where revision data is stored for all parameters, the revision history may only be stored in some implementations if at least one parameter of the module definition is modified. If the revision history is stored for all parameters of a module definition, the revision history is stored on what is referred to as the modular level. In some implementations, parameters may contain sub-parameters. If the revision history is stored for the all sub-parameters of a parameter, the revision history is stored on what is referred to as the parameter level. It is understood that the revision history may be implemented by storing modifications on any number of hierarchical levels such as a modular level, parameter level, sub-parameter level, etc.

The revision history may be stored in a number of different file configurations depending on the implementation. The revision history may be stored as part of the design file itself. Alternatively, the revision history of each module definition may be stored in a separate revision history file. In another embodiment, the revision history of all module definitions may be included in a single file.

Figure 2:
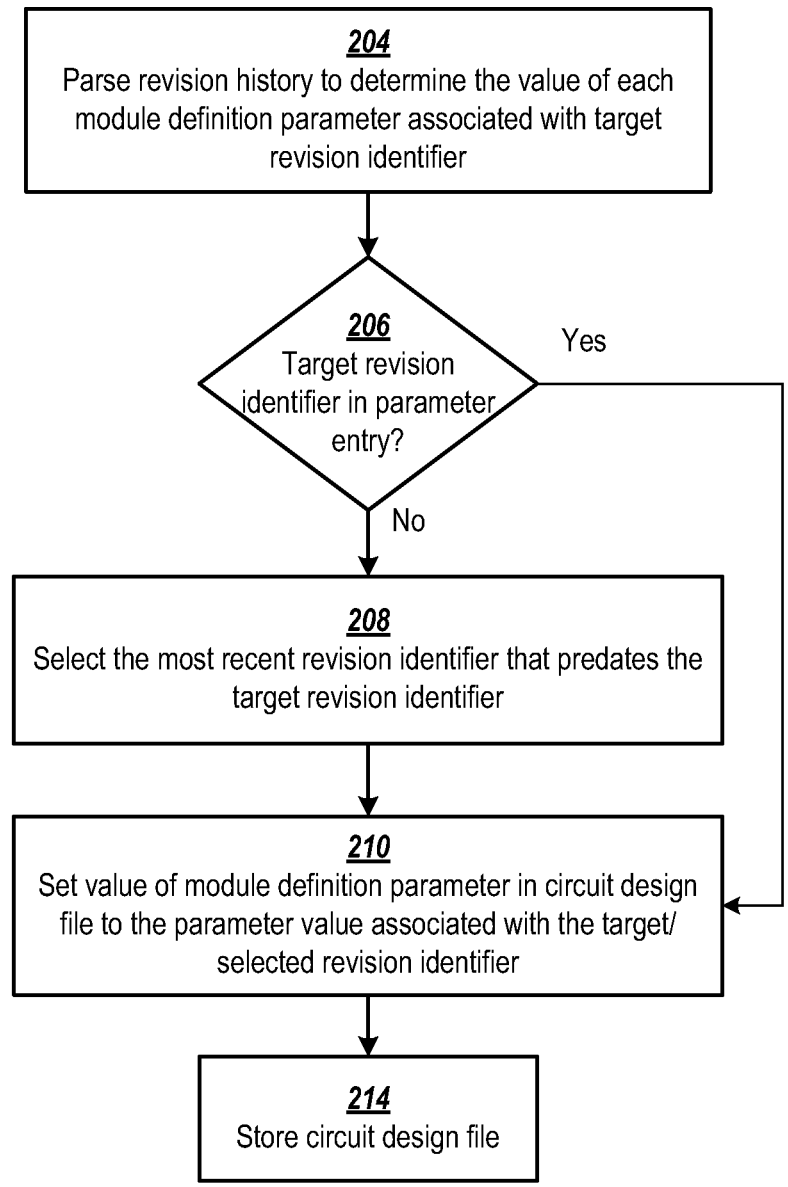
FIG. 2 shows a flowchart of a process for restoring the module definitions of a design to a previous revision in accordance with an embodiment of the invention.

Regardless of the file configuration used, by organizing the revision history according to a data structure hierarchy, previous revisions of the design can easily be reconstructed, reviewed, and compared. FIG. 2 shows a flowchart of a process for restoring the module definitions of a design to a previous revision in accordance with one or more embodiments of the invention. Revision history data is parsed at step 204 to determine the value of each module definition parameter associated with a target revision identifier.

Because revision data may not be included for a revision unless the module definition parameter has been modified, the revision history may not contain the target revision and corresponding value in the revision history entry of the parameter. For each module definition parameter in the revision history file, if the target revision identifier is in parameter entry at decision step 206, the value indicated by the target revision identifier is used. If the parameter entry does not contain a value for the target revision identifier, the most recent revision identifier, predating the target revision identifier, is located at step 208. For each parameter in the revision history, the value of the module definition parameter in the design file is set to the determined value from the revision history at step 210. The design file is then stored at step 214.

When designs are segmented into separately developed components, management of the various design files can be complex. Automated design environments provide a number of tools to assist developers with the management of complex design hierarchies. Designs are often organized into workspaces. A workspace is a file or directory that allows a user to gather various design files and resource libraries so they can be developed and tested as a cohesive unit. An update of an externally provided module definition may often require a developer to adjust several workspace parameters such as compiling options or memory mapping. In one embodiment of the invention, a revision history is maintained for workspace parameters that are changed because of module definition updates.

Figure 3:
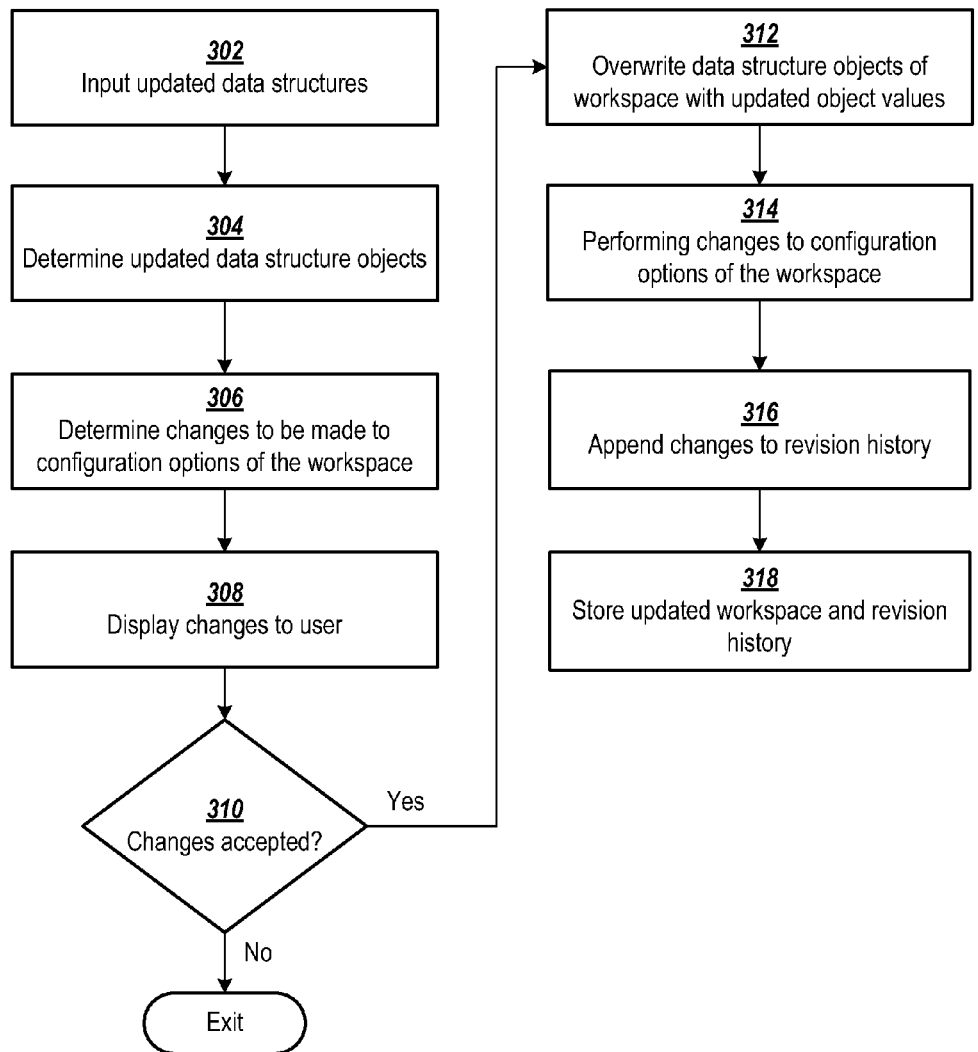
FIG. 3 shows a flowchart of a process for updating a design workspace and maintaining a workspace revision history in accordance with an embodiment of the invention.

FIG. 3 shows a flowchart of a process for maintaining and storing a revision history of module definitions in accordance with one or more embodiments of the invention. One or more updated data structures are input at step 302. For each updated data structure, objects of the data structure that have been modified are determined at step 304. Modified objects are determined by parsing the updated data structures and comparing the values of each object to a current value corresponding to the current version of the object. The current values may be determined from design files included in the workspace or from values stored in a revision history as discussed above. Changes to be made to configuration options of the workspace are determined at step 306. Updated values of objects and/or configuration option changes are displayed to the user at step 308. If the user decides to accept changes included in the updated data structure at decision step 310, values of data structure objects are overwritten with the updated values at step 312. Changes to configuration options are performed at step 314. Data indicative of the performed changes are appended to revision history at step 316. The updated workspace and revision history are stored at step 318.

The changes to configuration options of the workspace depend on the settings implicated by the particular modules that are modified. In one example situation, a design workspace may be created to develop software to be implemented on or with hardware that is in the process of being designed. As changes are made to the hardware, these changes must be reflected in the design workspace so the software design can be properly tested and debugged. For example, changes may be made by removing, modifying, or adding processors to the hardware design.

Updates are communicated to the workspace by providing a file of data structures for processors included in the hardware design. Various definition parameters of each module or processor may be included as objects within the data structure. For each processor that is removed, software platforms created for the processor, and software applications in the workspace created against the processor, are closed and removed from the workspace if changes are accepted.

For each processor that remains in the design, those processor parameters that control compiler flags may be checked for changes. If changes are accepted by the user, compiler flags are changed accordingly. Objects may be checked to determine if peripherals attached to the processor have changed. If changes are accepted, drivers for the peripherals are removed from or added to the workspace accordingly.

If the memory map of the processor has changed, the change may be recorded along with associated guidance for the user to adjust the workspace memory maps. If debug connectivity of any processor has changed, appropriate changes would be made to the debug configuration data structures of the workspace once changes are accepted.

If the user selects to proceed with the update, the workspace changes are performed and changes are added to the revision history of the workspace. If a hardware system is connected to the design environment, the hardware may be reset and a design bitstream incorporating changes to the workspace may be reloaded on the hardware. In this manner, a software workspace can be synchronized with a concurrent hardware design.

In some embodiments, an automated design environment may be configured to check for module definition updates from a centralized repository. When updates are present, parameter changes and necessary workspace changes can be automatically determined and presented to a user for authorization. This saves the user the manual work that would be necessary to modify each setting in the workspace and reduces the possibility of errors and incorrect behavior of the software. The software designer is also informed of the changes that have been made to the hardware configuration. The update process becomes the point at which the software developer can control changes to his workspace. He may choose to reject the hardware changes or accept the hardware changes along with associated workspace changes. If accepted changes have undesirable results, the developer may review the revision history to trace the source or the problem or revert to a previous workspace configuration and hardware revision.

Figure 4:
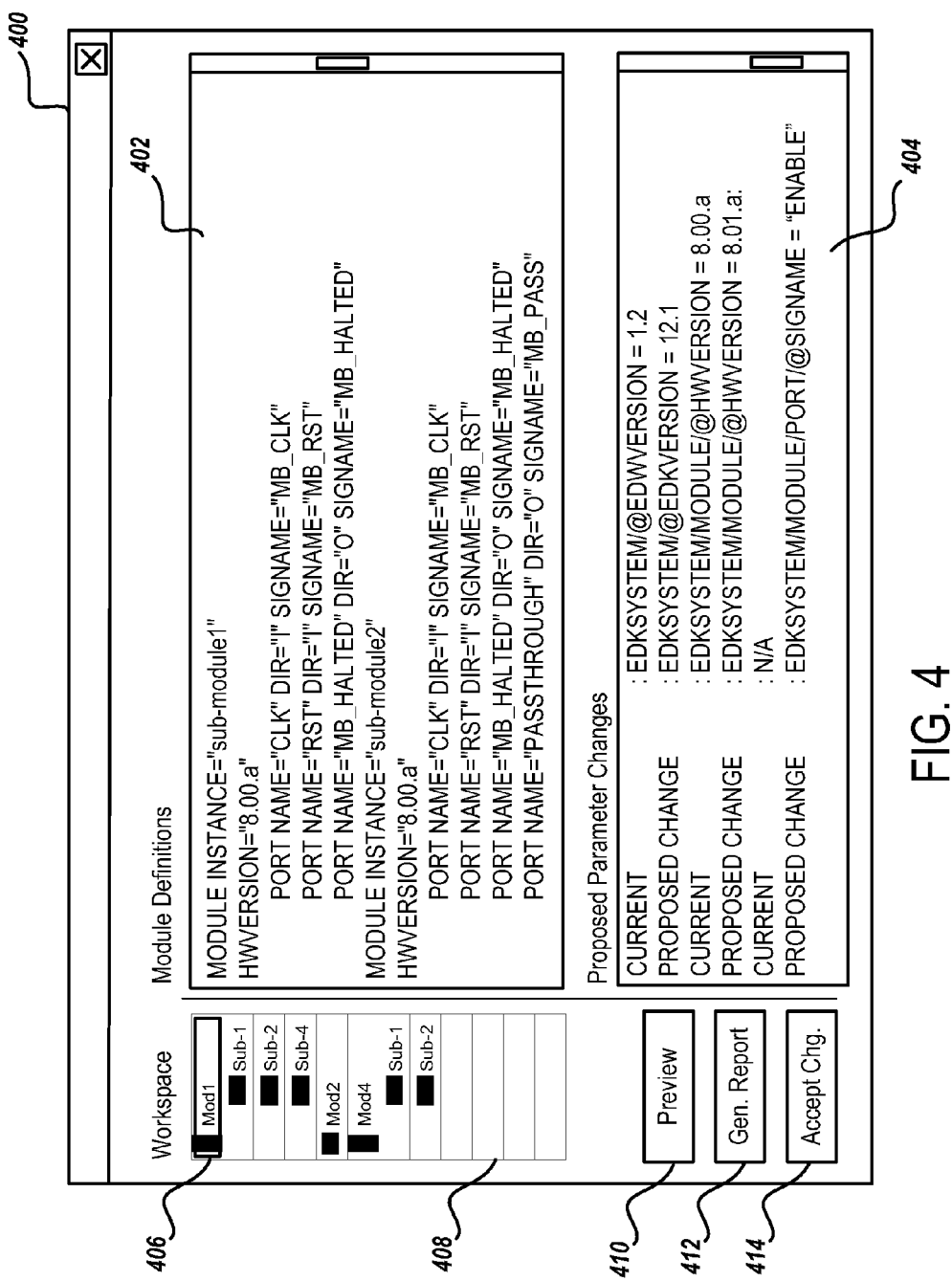
FIG. 4 shows a block diagram of an example GUI interface for reviewing and accepting changes included in the update of a file included in a design workspace.

FIG. 4 shows a block diagram of an example graphical user interface (GUI) for reviewing changes and accepting changes during an update of design workspace in accordance with one or more embodiments of the invention. In this example GUI, main window 400, includes three sub-window panes: 402,

404, and 408. Windowpane 408 displays a browsable hierarchy of design files included in the workspace. Windowpane 402 displays the content of design files selected from the hierarchy of design files in windowpane 402. Windowpane 404 shows revisions contained in an update.

In this example GUI, changes may be reviewed for specific objects such as modules of a design by selecting the module from the hierarchy 408, as shown by selection 406, and selecting preview button 410. When preview 410 is selected, changes specific to the module are displayed in windowpane 404. In this example implementation, a report showing changes to the workspace may be generated by selecting Gen. Report button 412. After reviewing changes included in an update, a designer may select Accept Chg. Button 414 to complete the update of the workspace. When changes are accepted, updated values are saved to pertinent design files of a workspace, and an entry reflecting change is added to a revision history of the workspace.

Figure 5:
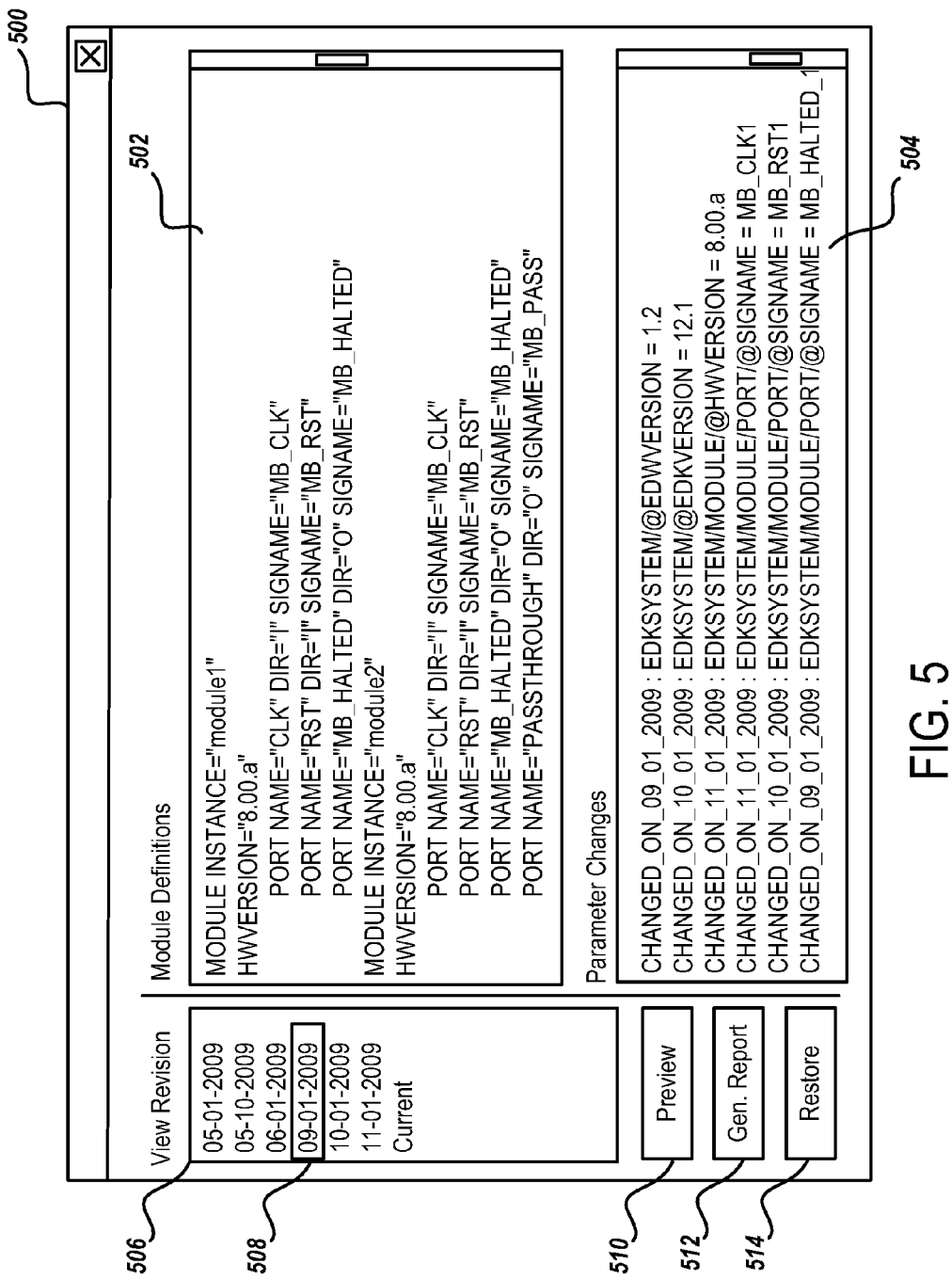
FIG. 5 shows a block diagram of an example GUI interface for displaying revision history in accordance with an embodiment of the invention.

FIG. 5 shows a block diagram of an example graphical user interface (GUI) for displaying revision history in accordance with one or more embodiments of the invention. In this example GUI, main window 500, includes three sub-window panes: 502, 504, and 506. Windowpane 502 displays the content of the current design file. The content may include design code. Windowpane 506 shows objects such as revisions present in the revision history of a design. In this example, a GUI revision can be highlighted as shown by 508 and displayed by selecting preview button 510. When preview is selected, changes between the selected revision and the current revision are displayed in windowpane 504. In this example implementation, the displayed preview shows all revision changes made during the selected time period. In some implementations, other data may be indicated. For example, a previewed revision may display only the differing values of each parameter. A generate report function is also provided by button 512. The generate report function generates a report showing all proposed changes.

In this example implementation, restore function 514 is provided. When restore 514 is selected, the value of each module definition parameter is set to the value of the parameter contained in the revision. In one embodiment, restore 514 stores restored module definition parameters in revision history as new changes. For example, a revision history may contain a parameter P with three previous revisions and a current revision along with corresponding values such as:

Parameter P: v1.0=4, v2.0=5, v3.0=3, v4.0=2.

If parameter P is restored to the value of revision v2.0, the value in the design is the corresponding value of five. The revision history is also updated as well as if this were a new modification. The resulting revision history becomes:

Parameter P: v1.0=4, v2.0=5, v3.0=3, v4.0=2, v5.0=5.

In another embodiment, the revision history may be restored to a version of the revision history corresponding to version v2.0, such as:

Parameter P: v1.0=4, v2.0=5

The restored revision may overwrite the existing design file and revision history or may be stored in a new file.

It is understood that module definition parameters may be stored in a number of formats. Revision history may be stored in an implementation specific format such as a coded plain text or may be stored in a standard format. For example, markup languages such as Extensible Markup Language (XML) provide semantics that can be used to define relationship data structures and data objects to be stored in revision history. Several functions exist to search XML encoded data structures that may be used with one or more embodiments of the present invention to parse the revision history.

Example 1, below, shows an example XML encoded revision history of a module definition. Example 2 shows a revision of the module definition shown in Example 1.

```
<?xml version="1.0" encoding="UTF-8" ?>
<EDKSYSTEM EDWVERSION="1.1" EDKVERSION="12.1">
<MODULE INSTANCE="microblaze_0" HWVERSION="7.01">
<PORT NAME="CLK" DIR="I" SIGNAME="MB_CLK" />
<PORT NAME="RST" DIR="I" SIGNAME="MB_RST" />
<PORT NAME="MB_HALTED" DIR="O" SIGNAME="MB_HALTED" />
</MODULE>
</EDKSYSTEM>
```

EXAMPLE 1

```
<?xml version="1.0" encoding="UTF-8" standalone="yes" ?>
-<EDKSYSTEM xmlns:_09_01_2009="09/01/2009" _09_01_2009:EDWVERSION="1.2" EDWVERSION="1.1" EDKVERSION="12.1">
-<MODULE INSTANCE="microblaze_0" HWVERSION="7.01">
<PORT NAME="CLK" DIR="I" SIGNAME="MB_CLK" />
<PORT NAME="RST" DIR="I" SIGNAME="MB_RST" />
<PORT NAME="MB_HALTED" DIR="O" SIGNAME="MB_HALTED" _09_01_2009:SIGNAME="MB_HALTED_1" />
</MODULE>
</EDKSYSTEM>
```

EXAMPLE 2

In Example 2, EDWVERSION has been updated from the value of 1.1 to 1.2. The sub-parameter SIGNAME of parameter MB_HAULTED of module microblaze_0 has been updated from MB_HALTED to MB_HALTED_1. An automated script can be used to parse the revision history and generate a report of changes. An example report generated by parsing the revision history data of Example 2 is shown in Example 3.

```
OPTION INPUT DB :x3361_example_chg_090109.xml
CHANGED_ON_09_01_2009:EDKSYSTEM/@EDWVERSION=1.2
CHANGED_ON_09_01_2009:EDKSYSTEM/MODULE/PORT/@SIGNAME=MB_HALTED_1
```

EXAMPLE 3

Example 4 shows a segment of Phython code that can be used to generate the report shown in Example 3 from the revision history shown in Example 2. This example parses revision history data stored in XML format to determine a complete revision history.

```
#    Main function
#######################################
if __name__ == "__main__":
    Gen_Report_i = Gen_Report (sys.argv)
```

```
if(Gen_Report _i.IS_VALID):
    db_file_ = open(Gen_Report.DB_FILE)
    db_dom2_ = parse(db_file_)
    Gen_Report _i.ShowChangeLog(db_dom2_.documentElement)
    db_dom2_.unlink( )
#       Gen_Report function
###########################################
class Gen_Report( ):
    GETOPT_USAGE = ("Usage : python Gen_Report.py\n"
        "\t--DB_FILE = [x3361 database xml file]\n"
        "\t--STATE_ON = [the state of the database on a certain date]\n"
        "\t--IN_FILE = [a file of the same schema as the database file to sync the
        database against]")
    GETOPT_OPTIONS = None
    GETOPT_LOPTIONS = [
        "DB_FILE = ",
        "STATE_ON = ",
        "IN_FILE = "
    ]
    def __init__ (self,iArgv = None):
        print "=================================================="
        Gen_Report.IS_VALID = False
        Gen_Report.DB_FALSE = None
        Gen_Report.IN_FILE = None
        Gen_Report.STATE_ON = None
        self.DB_CHANGES = { }
        self.DB_CHDATES = { }
        try :
            (cmd_opts_, cmd_args_) =
            getopt.getopt(iArgv[1 :],Gen_Report.GETOPT_OPTIONS,Gen_
            Report.GETOPT_LOPTIONS)
            if(len(cmd_opts _) == 0):
                raise getopt.GetoptError("No command options given.")
            if(len(cmd_args _) > 0):
                raise getopt.GetoptError("No command line arguments to this
                program.")
            for (cmd_opt_,cmd_par_) in cmd_opts_:
                if(cmd_opt_ == "--DB_FILE"):
                    if not(os.path.exists(cmd_par _)):
                        raise getopt.GetoptError("ERROR :Input file " + cmd_par_ +
                        "does not exist")
                    Gen_Report.DB_FILE = cmd_par_
                    print "OPTION INPUT DB \t: %s" % Gen_Report.DB_FILE
                elif(cmd_opt_ == "--STATE_ON"):
                    Gen_Report.STATE_ON = datetime.strptime(cmd_par_,
                    "%d/%m/%y")
                    Gen_Report.STATE_ON = cmd_par_
                elif(cmd_opt_ == "--IN_FILE"):
                    if not(os.path.exists(cmd_par _)):
                        raise getopt.GetoptError("ERROR : Comparision directory " +
                        cmd_par_ + "does not exist")
                    Gen_Report.IN_FILE = cmd_par_
                    print "OPTION COMPARE BASE \t: %s" % Gen_Report.IN_FILE
            if(Gen_Report.DB_FILE == None) :
                raise getopt.GetoptError("ERROR : Must specify input database
                file --DB_FILE")
            self.IS_VALID = True
        except getopt.GetoptError,err:
            print err.msg
            print "%s" % Gen_Report.GETOPT_USAGE
    def ShowChangeLog(self,iElem,iPath = None):
        tagName_ = iElem.tagName
        if(iPath == None):
            tagPath_ = tagName_
        else:
            tagPath_ = "%s/%s" % (iPath,tagName _)
        for idx_ in xrange(iElem.attributes.length):
            nmsp_ = iElem.attributes.item(idx_)prefix
            name_ = iElem.attributes.item(idx_).localName
            valu_ = iElem.attributes.item(idx_).value
            if((nmsp_ ! = None) and (nmsp_ == "xmlns")):
                datekey_ = datetime.strptime(valu_, "%d/%m/%Y")
                self.DB_CHDATES[datekey_] = name_
            elif((name_ ! = None) and (nmsp_ ! = None)):
                print "CHANGED_ON%s : %s/@%s = %s" %
                (nmsp_,tagPath_,name_,valu _)
        for elem_ in iElem.childNodes:
            if(elem_.nodeType == Node.ELEMENT_NODE):
                self.ShowChangeLog(elem_,tagPath _)
```

EXAMPLE 4

Those skilled in the art will appreciate that various computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

Figure 6:
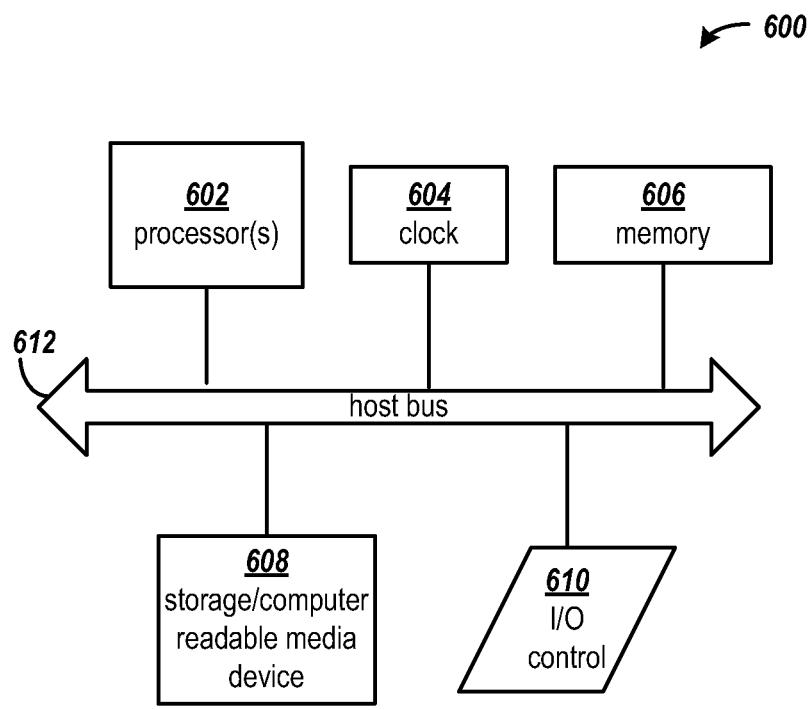
FIG. 6 shows a block diagram of a computing architecture that may be configured to perform the various processes of the present invention.

FIG. 6 shows a block diagram of a computing architecture that may be configured to perform the various processes of the present invention. Those skilled in the art will appreciate that various alternative computing arrangements, including one or more processors and a memory arrangement configured with program code, would be suitable for hosting the processes and data structures and implementing the algorithms of the different embodiments of the present invention. The computer code, comprising the processes of the present invention encoded in a processor executable format, may be stored and provided via a variety of computer-readable storage media or delivery channels such as magnetic or optical disks or tapes, electronic storage devices, or as application services over a network.

Processor computing arrangement 600 includes one or more processors 602, a clock signal generator 604, a memory unit 606, a storage unit 608, and an input/output control unit 610 coupled to host bus 612. The processor 602 may perform, for example, one or more steps of the flowcharts shown in FIGS. 1-3. The arrangement 600 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 602 may be one or more general purpose processors, or a combination of one or more general purpose processors and suitable co-processors, or one or more specialized processors (e.g., RISC, CISC, pipelined, etc.).

The memory arrangement 606 typically includes multiple levels of cache memory and a main memory. The storage arrangement 608 may include local and/or remote persistent storage such as provided by magnetic disks (not shown), flash, EPROM, or other non-volatile data storage. The storage unit may be read or read/write capable. Further, the memory 606 and storage 608 may be combined in a single arrangement.

The processor arrangement 602 executes the software in storage 608 and/or memory 606 arrangements, reads data from and stores data to the storage 608 and/or memory 606 arrangements, and communicates with external devices through the input/output control arrangement 610. These functions are synchronized by the clock signal generator 604.

The resource of the computing arrangement may be managed by either an operating system (not shown), or a hardware control unit (not shown).

The present invention is thought to be applicable to a variety of systems implementing revision history data. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of updating a software design environment workspace, comprising:

retrieving, by a processor, a hardware design revision history, the hardware design revision history indicating revision data for each change to module definition parameters of the hardware design, the revision data indicating a revision identifier and an updated value of each changed module definition parameter;

determining a revision identifier of a current configuration of the workspace;

parsing the hardware design revision history;

determining a current value for each module definition parameter corresponding to a most recent revision identifier in the hardware design revision history;

for each module definition parameter, determining differences between the current value and a value of the parameter in the workspace; and in a window on a display device, simultaneously displaying a plurality of user-selectable revision identifiers of revisions of the hardware design, and in response to a first user selection of one of the revision identifiers simultaneously displaying, for only revisions from the one of the user-selectable revision identifiers to a most recent revision and module definition parameters having changed values, module definition parameter identifiers of module definition parameters of the hardware design and values of the module definition parameters corresponding to the revision identifiers of the revisions from the one of the user-selectable revision identifiers to the most recent revision;

in response to a user-initiated restore function and a selected revision identifier, for each object in the revision history data, determining a value corresponding to the selected revision identifier; and generating a modified version of the workspace, the modified version of the workspace having the value of each object corresponding to an object in the revision history data set to the value corresponding to the selected revision identifier.

2. The method of claim 1, wherein revision data is stored in markup language format indicating the logical relationship between module descriptions and module description parameters.

3. The method of claim 1, further comprising:
displaying determined differences; and
updating the value of one or more module definition parameters with respective current values in response to a user command.

4. A method for updating a design workspace containing one or more data structures and maintaining revision history, the method comprising:

inputting an updated version of a data structure file for one of the one or more data structures contained in the workspace;

determining, by a processor, objects of the one data structure that have been modified from a previous version;

in a window on a display device simultaneously displaying a plurality of user-selectable revision identifiers of versions of the data structure file, and in response to user selection of one of the revision identifiers simultaneously displaying, for only versions from the one of the user-selectable revision identifiers to a most recent version and module definition parameters having changed values, values of each modified object of the versions from the user-selected one of the user-selectable revision identifiers to the most recent revision;

in response to a first control input indication to proceed with changes, for each modified object and corresponding object in the design workspace:

overwriting a value of the corresponding object in the design workspace with a value of the modified object in the updated version of the data structure file; and appending revision data to revision history data, the revision data indicating a revision identifier, an object identifier of the modified object, and an updated value of the modified object;

in response to a second control input by a user indicating an input revision identifier, for each object in the revision history data, determining a value corresponding to the input revision identifier; and generating a modified version of the workspace, the modified version of the workspace having the value of each object corresponding to an object in the revision history data set to the value corresponding to the input revision identifier.

5. The method of claim 4, further comprising determining changes to configuration options of the workspace needed to incorporate modified objects into the workspace;

displaying the determined changes to the configuration options; and in response to the first control input indication to proceed with changes, performing determined changes to the configuration options.

6. The method of claim 4, wherein appending revision data includes:

determining whether an entry for the modified object is contained in the revision history data;

appending the revision data to the entry in response to determining whether an entry for the modified object is contained in the revision history data; and inserting a new entry for the modified object in the revision history data in response to determining whether an entry for the modified object is not contained in the revision history data, the new entry indicating an object identifier, a revision identifier, and the updated value of the modified object.

7. A user interface, comprising:

a display device configured to display:

a first sub-window pane that displays a plurality of objects;

a second sub-window pane that displays the contents of a selected one of the plurality of objects; and a third sub-window pane that displays changes that are specific to the selected object, wherein the plurality of objects in the first sub-window includes a plurality of user-selectable revision identifiers of a plurality of revisions, and the displayed changes include, in response to user selection of one of the revision identifiers and for only revisions from the one of the user-selectable revision identifiers to a most recent revision, a plurality of simultaneously displayed ones of the revision identifiers and a module definition parameter identifier from the contents of the selected object, and simultaneously displayed updated values of the changed module definition parameter in the revisions from the user-selected one of the user-selectable revision identifiers to the most recent revision;

a restore function that, responsive to a control input by a user indicating an input revision identifier, for each object in the revision history data, determines a value corresponding to the input revision identifier and generates a modified version of the workspace, the modified version of the workspace having the value of each object corresponding to an object in the revision history data set to the value corresponding to the input revision identifier.

8. The user interface of claim 7, wherein:

the contents of the selected object in the second sub-window pane includes design code of the selected revision indicator; and the displayed changes further include changes between the selected revision identifier and a current revision of the plurality of revisions.

9. The user interface of claim 7, wherein the contents of the selected object in the second sub-window pane includes hardware design code of the selected revision identifier.

10. The user interface of claim 7, wherein:

the contents of the selected object in the second sub-window pane includes hardware design code of the selected revision identifier; and the module definition parameter identifier is a parameter in the hardware design code, and the displayed changes include values of the parameter.

* * * * *